US009438420B2

(12) United States Patent
Roberts et al.

(10) Patent No.: US 9,438,420 B2
(45) Date of Patent: Sep. 6, 2016

(54) UNPREDICTABLE NUMBER GENERATION

(71) Applicant: MasterCard International Incorporated, Purchase, NY (US)

(72) Inventors: David A. Roberts, Warrington (GB); Michael Ward, Nr. Bridgewater (GB)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 14/321,023

(22) Filed: Jul. 1, 2014

(65) Prior Publication Data

US 2015/0010149 A1 Jan. 8, 2015

(30) Foreign Application Priority Data

Jul. 2, 2013 (GB) .................................. 1311838.5

(51) Int. Cl.
*H04L 9/00* (2006.01)
*H04L 9/08* (2006.01)
*G06F 21/72* (2013.01)

(52) U.S. Cl.
CPC ............. *H04L 9/0869* (2013.01); *G06F 21/72* (2013.01); *H04L 2209/56* (2013.01)

(58) Field of Classification Search
CPC ............. H04L 9/0869; H04L 2209/24; H04L 9/0816; H04L 9/0662; H04L 9/0894
USPC ......................................................... 380/46
See application file for complete search history.

(56) References Cited

U.S. PATENT DOCUMENTS

| 5,778,069 A | 7/1998 | Thomlinson et al. |
| 2004/0078576 A1 | 4/2004 | Geitinger |
| 2004/0162864 A1 | 8/2004 | Nowshadi et al. |
| 2006/0189298 A1 | 8/2006 | Marcelli |
| 2010/0017615 A1 | 1/2010 | Sorensen |
| 2011/0258452 A1* | 10/2011 | Coulier ................... G06F 21/31 713/171 |
| 2012/0183139 A1* | 7/2012 | Matsuo ................. H04L 9/0844 380/255 |

FOREIGN PATENT DOCUMENTS

| EP | 1840731 A2 | 10/2007 |
| WO | 2007/026287 A1 | 3/2007 |

OTHER PUBLICATIONS

Yi Olan, David Tippper; Information Assurance; Nov. 2007; Morgan Kaufman Publishers Inc.; Full Text.*
Anand Kannan, Q, Gerald Maguire, Jr.; N-ary tree bassed key distribution in a network as a servcice procvisioning model; Aug. 2012; ACM Puiblishing; Full Text.*
UK Intellectual Property Office, "Patents Act 1977: Search Report under Section 17(5)", Dec. 11, 2013, for GB Patent Application No. 1311838.5, 4pgs.

* cited by examiner

*Primary Examiner* — Kambiz Zand
*Assistant Examiner* — Stephen Sanders
(74) *Attorney, Agent, or Firm* — Buckley, Maschoff & Talwalkar LLC

(57) ABSTRACT

A method of generating an unpredictable number in a computing device is provided. The method comprises the computing device performing the following programmed steps: obtaining a plurality of data elements; performing a first one way function on an internal value P and the plurality of data elements to update the value P; and performing a second one way function on the value P to obtain the unpredictable number. A computing device adapted to perform this method is also described.

21 Claims, 8 Drawing Sheets

UNPREDICTABLE NUMBER GENERATION

CROSS-REFERENCE TO RELATED APPLICATION

This application is a U.S. National Stage filing under 35 U.S.C. §119, based on and claiming benefit of and priority to GB Patent Application No. 1311838.5 filed Jul. 2, 2013, the entire contents of which are hereby incorporated in their entirety for all purposes.

FIELD

The present invention relates to electronic authentication systems, in particular to unpredictable number generation for cryptographic data exchanges.

BACKGROUND

During secure data exchanges between two parties, cryptographic protocols are used to verify and authenticate communications in order to ensure that the communications are genuine. This protects the communications from being monitored or altered. These cryptographic protocols can be used for example, between a computer and a remote server or during payment transactions to establish secure data exchanges.

Electronic authorisation systems for payment transactions use cryptographic protocols such as those developed by EMVCo LLC which are published as specifications entitled "Integrated Circuit Card Specifications for Payment Systems". These specifications are publically available and are presently at version 4.3 (currently available at http://www-w.emvco.com/specifications.aspx).

The specifications define a set of requirements to ensure interoperability between payment devices, e.g. contact or contactless integrated circuit chip cards, and Points of Interaction (POIs), e.g. card terminals or ATMs. This interoperability is on a global basis, regardless of the manufacturer, financial institution, or where the card is used.

Payment transactions involve cryptographic protocols that make use of unpredictable random numbers. Typically, these random numbers are newly generated for each payment transaction. Without randomness from the random numbers, the payment transactions are deterministic and hence susceptible to fraud as they could be simulated, cloned or modified. The ability for a POI to generate truly unpredictable numbers is therefore important to the security of payment transactions.

A paper presented at the Workshop on Cryptographic Hardware and Embedded Systems in 2009 by A. T. Markettos and S. W. Moore entitled "The Frequency Injection Attack on Ring-Oscillator-Based True Random Number Generators" discusses an example of a vulnerability in existing Random Number Generators (RNGs) used in POIs. The paper discloses that applying an electromagnetic field at certain frequencies to a ring-oscillator-based RNG (a type of hardware RNG commonly used in POIs) can significantly limit the range of possible numbers that the RNG will randomly pick from. The reduction in possible numbers means that payment transactions are more easily simulated, cloned or modified.

Against this background, the present invention aims to provide improved unpredictable number generation.

SUMMARY OF THE INVENTION

In a first aspect, the invention provides a method of generating an unpredictable number in a computing device, the method comprising the computing device performing the following programmed steps: obtaining a plurality of data elements; performing a first one way function on an internal value P and the plurality of data elements to update the value P; and performing a second one way function on the value P to obtain the unpredictable number.

This approach to generation of an unpredictable number is reliable and resistant to subversion of a random number generator. It is also robust against replay and other potential forms of attack.

Preferably, at least one of the data elements varies with time or with activity of the computing device. This may be a clock internal to the computing device.

Preferably, at least one of the plurality of data elements is a random number generated internally to the computing device, the method further comprising generating the random number prior to performing the first one way function. Generating the random number may comprise operating a hardware random number generator internal to the computing device.

Preferably, one or both of the one-way functions are cryptographically secure one-way functions. Each cryptographically secure one-way function may be a symmetric cipher, an asymmetric cipher, or a hash function. In embodiments, the first one-way function and second one-way function may be substantially the same.

Preferably, there is also an initial step of obtaining a seeded value of P, and of obtaining an initial value of the unpredictable number by performing the first one way function on the seeded value of the value P and a plurality of startup data elements to update the value P; performing the second one way function on the value P to obtain the unpredictable number.

In a further aspect, there is provided a method of authenticating a transaction between computing devices at a first computing device, comprising generating an unpredictable number by the method described above, sending transaction data and the unpredictable number to the second computing device, receiving from the second computing device cryptographically signed data formed from at least some of the transaction data and the unpredictable number, and reviewing the cryptographically signed data to determine that it incorporates the unpredictable number.

Preferably, at least one of the plurality of data elements is transaction dependent. One or more of the transaction dependent data elements may be an identity associated with one of the two computing devices.

In embodiments, the transaction may be a financial transaction, wherein the first computing device is a terminal and wherein the second computing device is a transaction card or a proxy for a transaction card. This is a particularly effective field of use for embodiments of the invention, as it is then of direct assistance in prevention of fraud by subversion leading to approval of illicit financial transactions. In such a case, one of the transaction related data elements may be a financial value associated with the transaction.

In a further aspect, the invention provides a computing device comprising a processor and a memory, wherein the programmed processor provides means to generate an unpredictable number according to the method described above.

Preferably, the computing device comprises a hardware random number generator.

In a still further aspect, the invention provides a computing device as described above, wherein the programmed processor provides means to authenticate a transaction with a second computing device according to the method described above. Preferably, the computing device is adapted to make a data connection with the second computing device.

In preferred embodiments, the computing device is a point of interaction or is able to make a data connection with a point of interaction and the second computing device is payment device. The point of interaction may for example be a point of sale terminal or an automatic teller machine.

In further aspects, the invention provides a computer program for instructing a computer to perform methods as described above, and a computer readable medium having stored thereon instructions for a computer to perform methods as described above.

BRIEF DESCRIPTION OF THE DRAWINGS

In order that the invention may be more readily understood, embodiments of the invention will now be described in more detail, by way of example only, and with reference to the following figures in which.

DETAILED DESCRIPTION OF THE PREFERRED EMBODIMENTS

Figure 1:
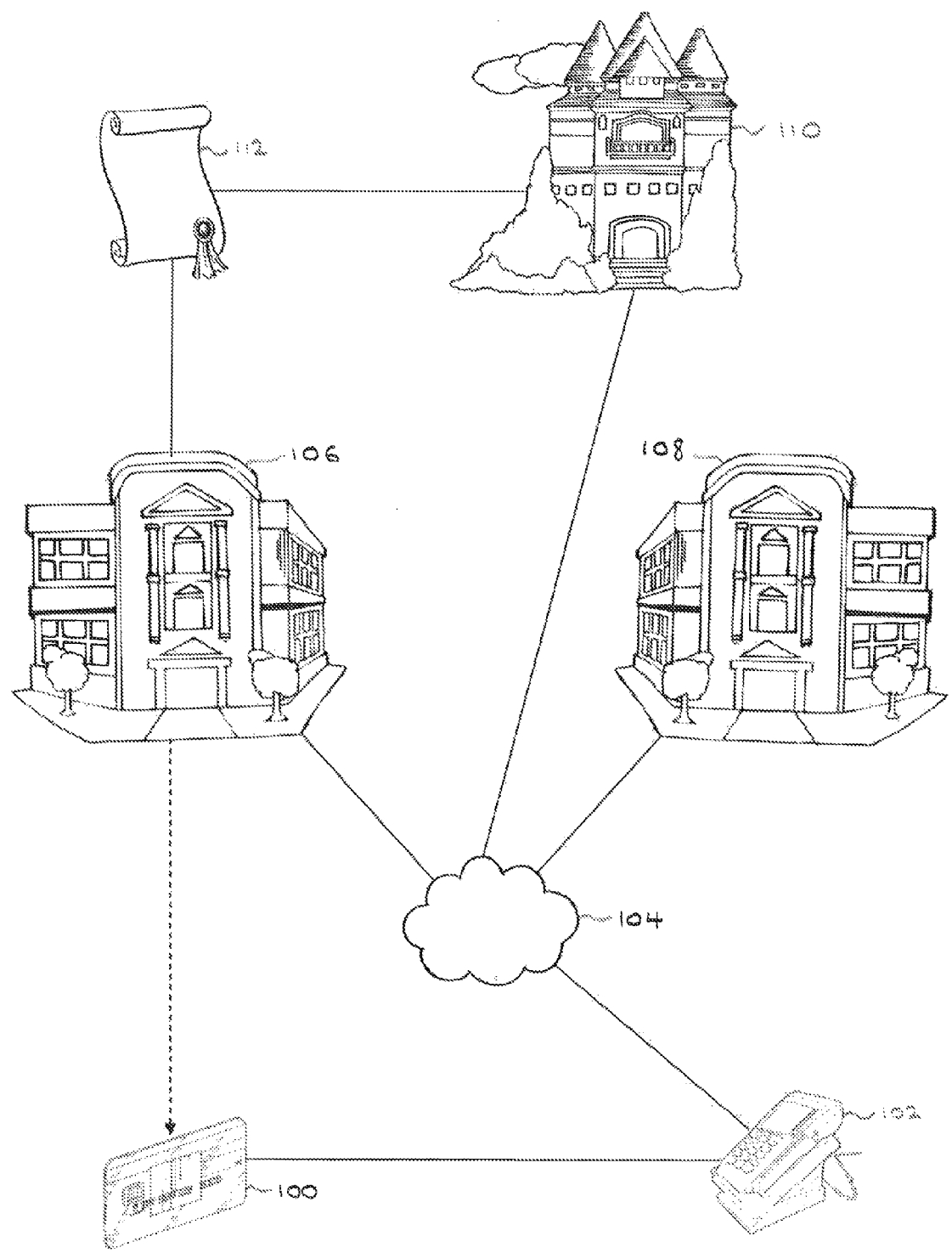
FIG. 1 is a schematic of the entities involved in a payment transaction.

FIG. 1 is a representation of the entities involved in a payment transaction. A payment device 100 is shown connected to a point of interaction 102 (POI). In this embodiment, the payment device 100 is an integrated circuit chip card, and the POI 102 is a card terminal. The POI 102 and payment device 100 are temporarily connected for the purposes of carrying out a payment transaction. The POI 102 is operatively connected to a communications network 104. The communications network 104 allows two way data transfer between any of the entities connected to it. For example, the communications network 104 may be a local area network, wide area network or the Internet.

An issuer 106, an acquirer 108 and a certification authority 110 are also operatively connected to the communications network 104. In this embodiment, the issuer 106 and the acquirer 108 are a first and a second financial institution, such as a bank, and are represented in FIG. 1 by office buildings. The certification authority 110 is represented by a castle in FIG. 1.

In other embodiments, the payment device 100 is connected to the communications network 104 instead of to the POI 102. The payment device 100 then uses the communications network 104 to connect with the point of interaction 102 to carry out payment transactions. This means that the payment device 100 and POI 102 would not be required to be in the same physical location as each other.

In this embodiment, the issuer 106 creates the payment device 100 with symmetric keys shared between the issuer 106 and the payment device 100 that is used to cryptographically authenticate transactions from the card, so that the issuer may have confidence that the authentic card was used in a transaction. The issuer 106 may also include in the payment device 100 other cryptographic keys such as symmetric keys for management of the payment device 100 or asymmetric key pairs (a public key and a private key) used to authenticate the payment device 100 to the POI 102. The private key is used to sign plain text to create digital signatures during payment transactions and the public key is used to verify the signatures. A certificate 112 is created by the certification authority 110 to certify the public key. The certificate 112 affords third parties a level of confidence that digital signatures made using the private key that corresponds to the certified public key are genuine.

The payment device 100 is supplied to a payment device holder who has a financial account with the issuer 106. The payment device 100 allows the payment device holder electronic access to their financial account and to carry out payment transactions with the POI 102.

The POI 102 is installed at a merchant who has a financial account with the acquirer 108. During a payment transaction, the POI 102 communicates with the acquirer 108, instructing the acquirer 108 with the payment transaction data. The acquirer 108 uses this data to authenticate the payment transaction and requests the transfer of funds from the payment device holder's financial account as appropriate.

For example, if the payment device holder is a person who wants to purchase a coffee from a cafe, they would connect the payment device 100 to a POI 102 at the cafe to pay for the coffee. If the payment transaction was successfully authenticated, the bank of the coffee shop would request the payment for the coffee to be transferred from the financial account of the person to the financial account of the coffee shop.

Figure 2:
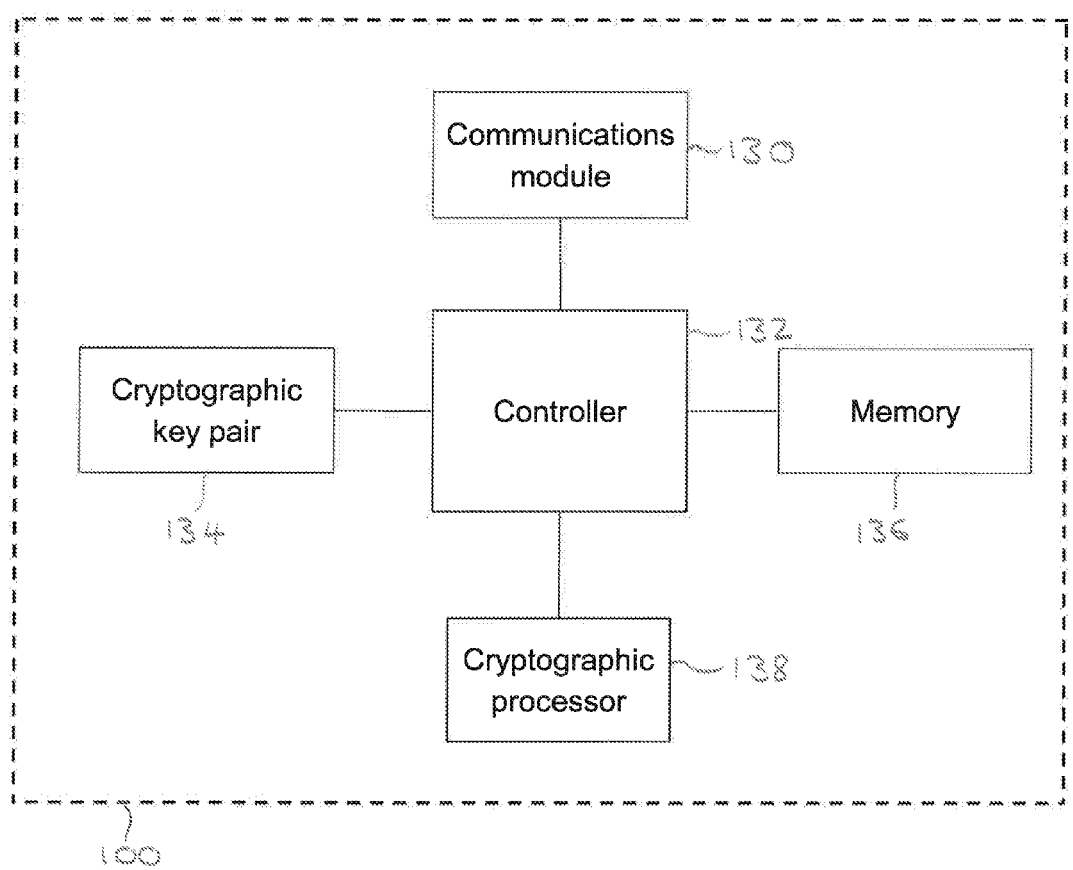
FIG. 2 is a schematic of a payment device.

Referring now to FIG. 2, the payment device 100 comprises a communications module 130 for transferring data with the POI 102 connected to a controller 132. The cryptographic symmetric key and asymmetric key pair 134 (the public key and the private key) and a memory 136 are connected to the controller 132. The cryptographic key pair 134 may also be located in the memory 136. A cryptographic processor 138 used for generating cryptograms and digital signatures is connected to the controller 132. The memory 136 stores information and is a non-volatile memory. The payment device may also be implemented on a secure element (SE).

Figure 3:
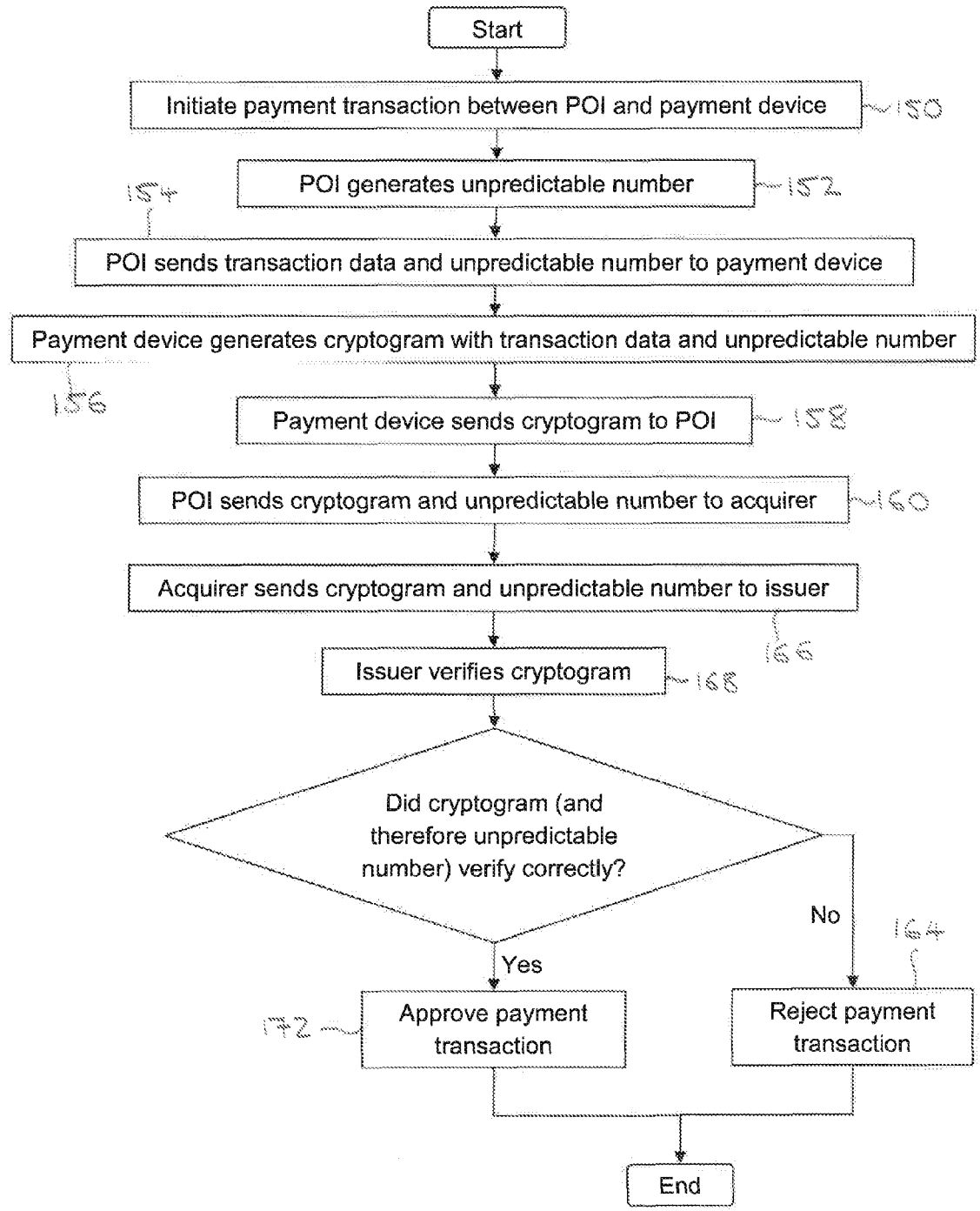
FIG. 3 is a flowchart showing an example of a payment transaction process.

FIG. 3 shows an exemplary process of a payment transaction between the payment device 100 and the POI 102. In Step 150, the payment transaction is initiated. For example, the merchant would enter a desired payment on the POI 102 and the payment device holder would connect their payment device 100 with the POI 102. Following this, in Step 152, the POI 102 generates an unpredictable number. This process will be described in more detail later. The POI 102 then sends the transaction data (i.e. data associated with the payment transaction such as the desired payment, currency, date and/or time, POI identity number, geographic location of the POI or issuer authorisation number) along with the unpredictable number to the payment device in Step 154.

In this embodiment, all transaction data is supplied in a single step. However, in other embodiments, the transaction data is supplied in a plurality of data exchanges, allowing the payment device 100 to request only parts of the transaction data required instead of having to receive all transaction data. This would reduce the amount of transaction data being communicated and hence reduce the time required to transfer the transaction data.

Once the payment device 100 has received the transaction data and the unpredictable number, it proceeds to generate cryptograms in Step 156. The transaction data and the unpredictable number are authenticated for the issuer 106 with the symmetric key by generating a cryptogram over the transaction data and the unpredictable number and may also be signed for the POI 102 using the asymmetric private key using the cryptographic processor 138. The result is then communicated to the POI (Step 158).

The POI 102 sends the cryptogram, transaction data and the unpredictable number to the acquirer 108 via the communications network 104 in Step 160.

The process continues to Step 166 where the acquirer 108 sends the cryptogram, transaction data and unpredictable number to the issuer 106. The issuer 106 is able to verify the cryptogram with the shared symmetric key in Step 168. If the cryptogram is invalid, then the POI is instructed to reject the payment transaction in Step 164.

The issuer 106 then performs other checks on the transaction data for example, ensuring that the payment device holder has sufficient funds in their financial account and/or whether it is feasible that the payment device holder is in the same geographic location as the POI 102. The POI is then instructed to approve the payment transaction in Step 172.

Figure 4:
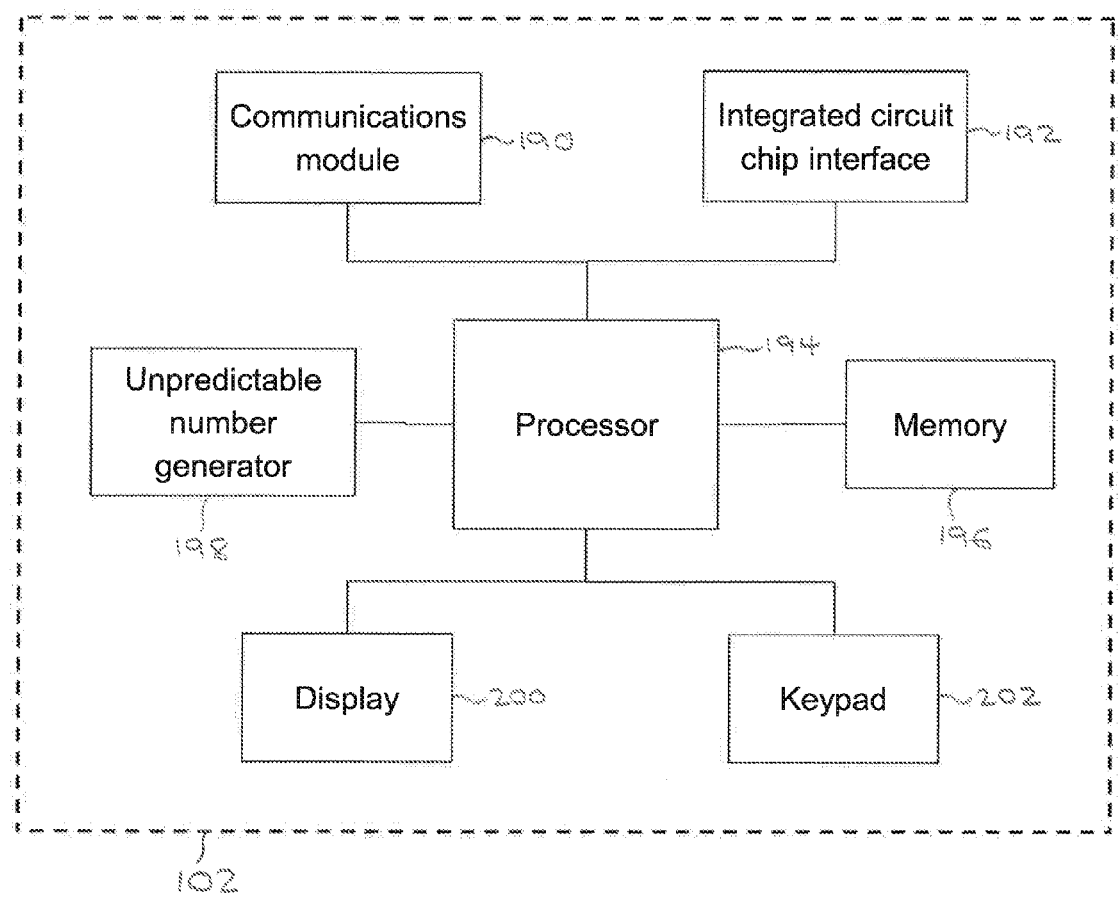
FIG. 4 is a schematic of a point of interaction.

FIG. 4 shows the POI 102 comprising a communications module 190 for connecting to the communication network 104 and an integrated circuit chip interface 192 for connecting to the integrated circuit chip in the payment device 100, for example using ISO 7816-4 protocols as are known in the art. The communications module 190 and the integrated circuit chip interface 192 are connected to a processor 194.

The POI 102 further comprises a memory 196 and an unpredictable number generator 198. The unpredictable number generator 198 can be used to provide unpredictable numbers for payment transaction as described above in relation to FIG. 3. The POI 102 also comprises a display 200 and keypad 202 for user input/output. The memory 196, unpredictable number generator 198, display 200 and keypad 202 are each connected to the processor 194.

Figure 5:
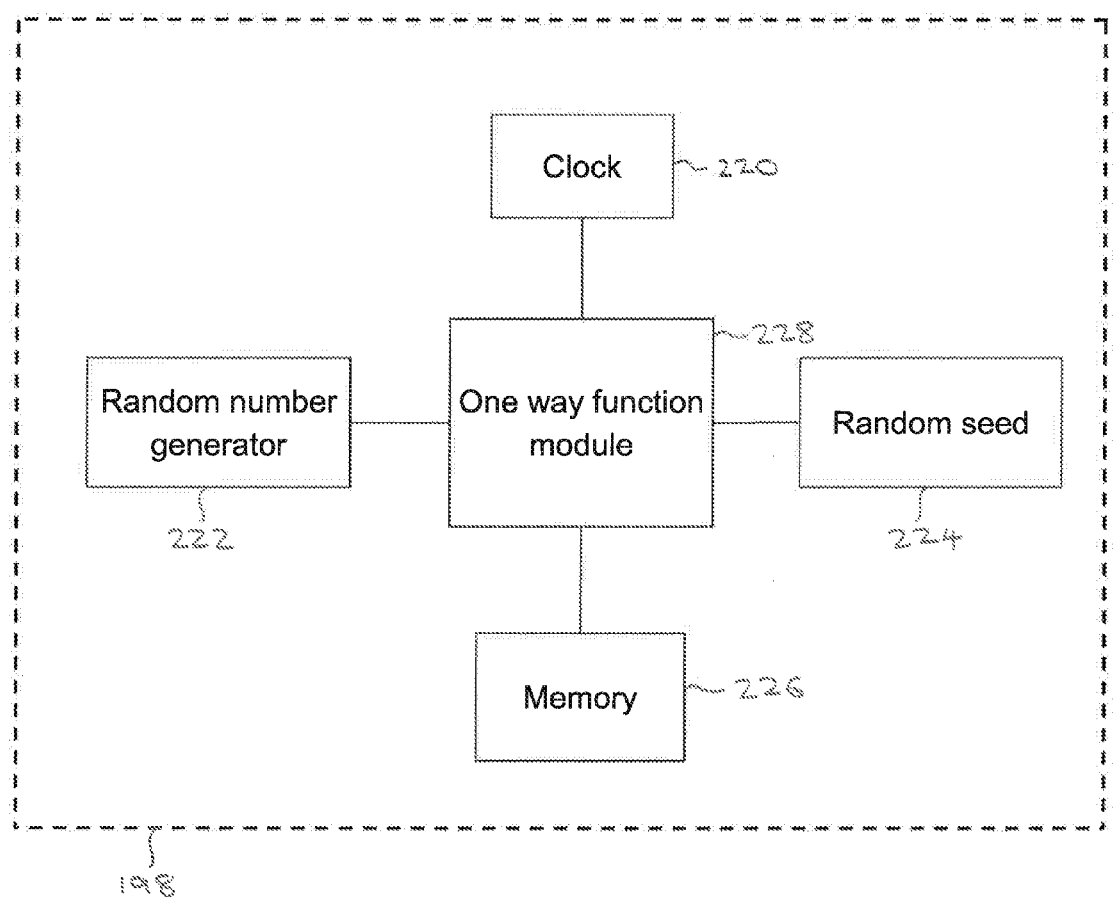
FIG. 5 is a schematic of an unpredictable number generator according to an embodiment of the invention.

FIG. 5 shows the unpredictable number generator 198. This comprises a clock 220, a random number generator 222, a random seed 224 (which may for example have been included on manufacture) and a memory 226. Each of these is shown as connected to a one way function module 228. The clock 220 is a time counter, for example synchronised with a time server or intentionally not synchronised such that the value of the clock could not be guessed by an external observer.

The random number generator 222 is capable of producing at least 32 random bits per invocation. The random seed 224 may have been generated separately and included on manufacture, though in embodiments it may also be from an RNG, capable of producing at least 64 random bits per invocation. In other embodiments the random seed 224 is generated by the random number generator 222.

The one-way function module 228 performs one-way functions on inputs such as those from the clock 220, the memory 226, the random number generator 222, random seed 224 and from the processor 194. The one-way functions are cryptographically secure, for example a symmetric cipher, an asymmetric cipher or a hash function as are known in the art. The memory 226 is non-volatile memory, such that data stored is persistent when power to the unpredictable number generator 198 is lost.

Figure 6:
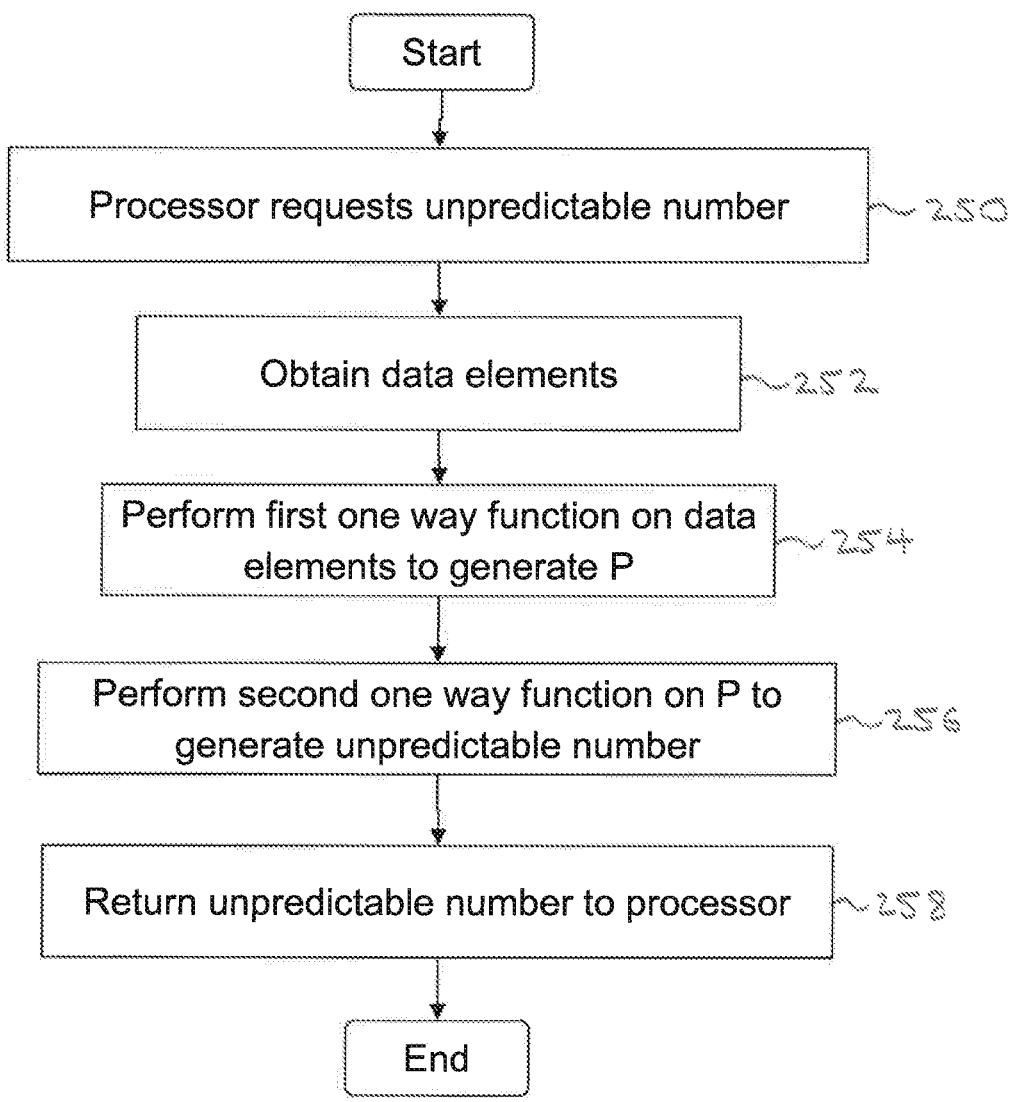
FIG. 6 is a flowchart showing a method of generating an unpredictable number according to an embodiment of the invention.

FIG. 6 provides an overview of the process described in Step 152 of FIG. 3 in which the POI 102 generates the unpredictable number. The processor 194 instructs the unpredictable number generator 198 in Step 250 that it requires an unpredictable number. Following this, in Step 252, the one-way function module 228 obtains a plurality of data elements. These data elements include static data and variable data. Examples of static data include an acquirer identity number and a POI identity number. Examples of variable data include, card cryptograms, date/time from the clock and randomly generated numbers.

In Step 254, the one way function module 228 performs a first one-way function on the plurality of data elements to generate a pre-image, P. The unpredictable number is then generated by the one way function module 228 by performing a second one-way function on the pre-image in Step 256. This unpredictable number is then sent to the processor 194 in Step 258.

The second one way function is performed to obscure the pre-image and means that the pre-image itself is never output from the unpredictable number generator 198. The second one way function increases the security of the process because it obfuscates the first one way function and its data elements. This prevents the output of the unpredictable number generator 198 from being predictable.

The unpredictable number generated in the unpredictable number generation process described in FIG. 6 gains randomness from all the variable data elements and from the first and second one-way functions. This improves the security of this process as it is not directly dependent on a random number generator. For example, if the RNG 198 comprised only a ring-oscillator-based hardware RNG that was subjected to a frequency injection attack (as described in the aforementioned paper by A. T. Markettos and S. W. Moore), the output of the unpredictable number generator would remain unpredictable and secure. The attacker would not be able to tell if their attack had had any effect or not.

Figure 7A:
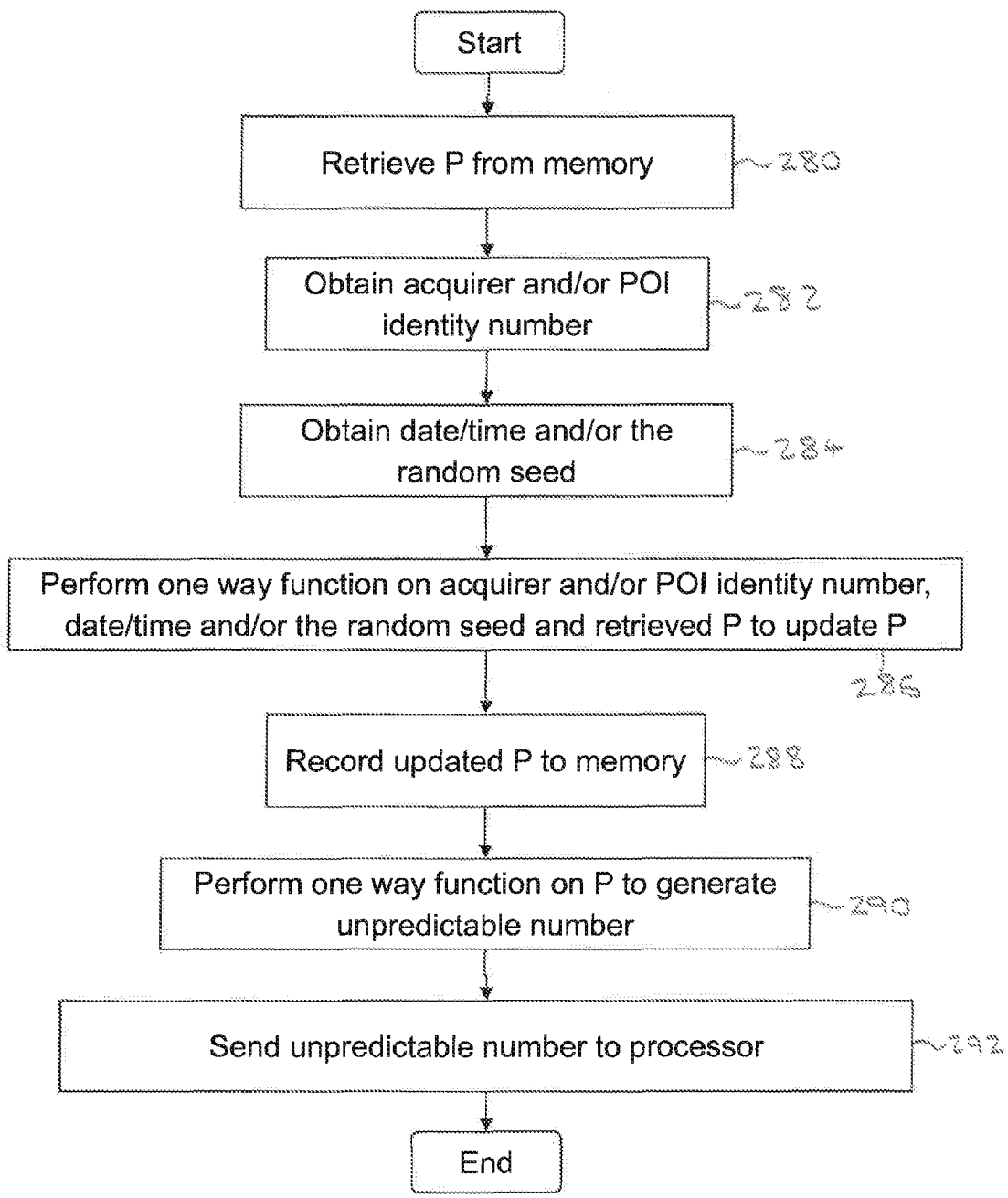
FIG. 7(a) is a flowchart showing an example of a method of generating an unpredictable number prior to generating a first ciphertext.
Figure 7B:
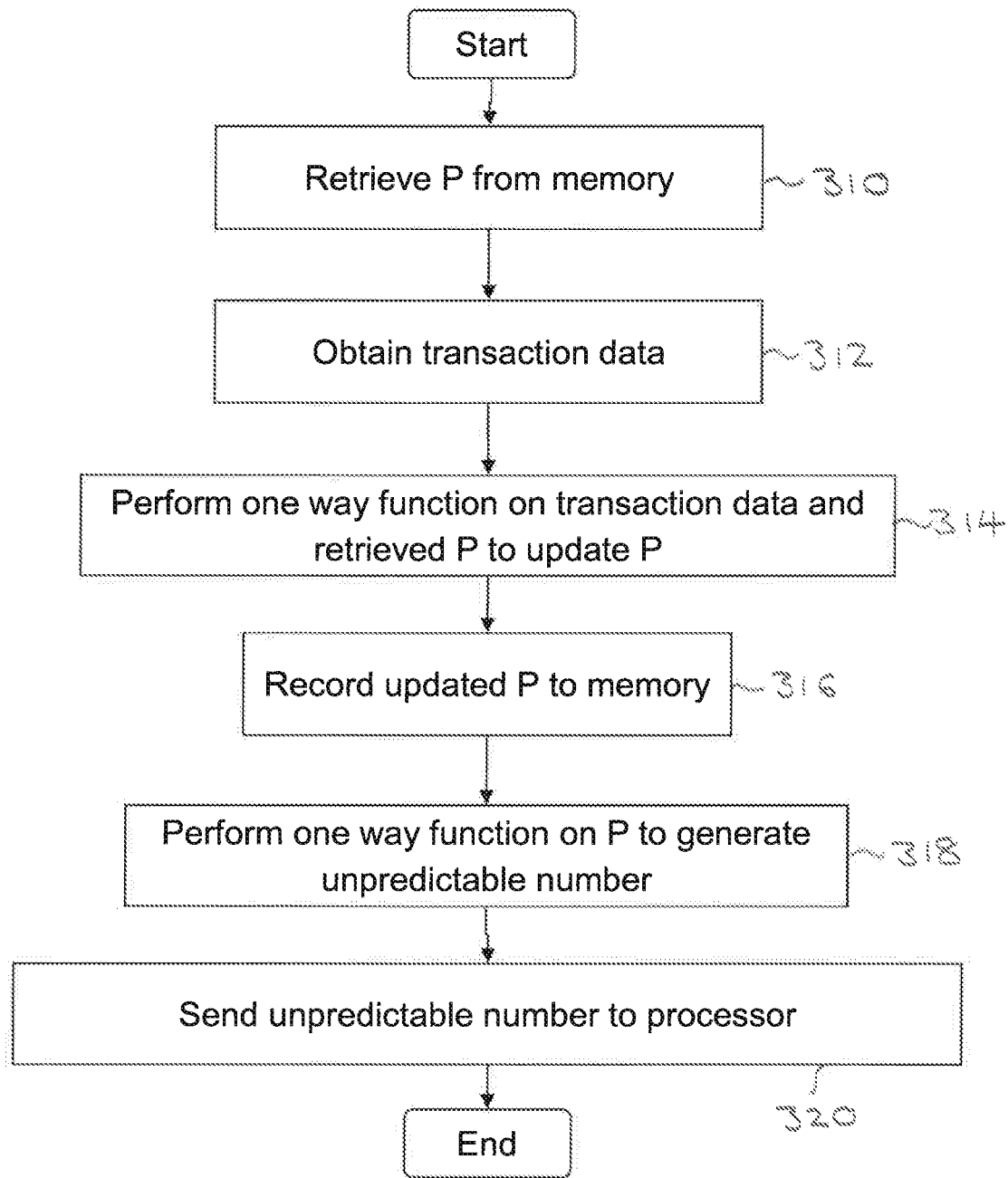
FIG. 7(b) is a flowchart showing an example of a method of generating an unpredictable number prior to generating a second ciphertext.

FIG. 7(*a*) is a flowchart showing an example of the process in FIG. 6 before a first ciphertext is generated in a first payment transaction. In Step 280, the one-way function module 228 retrieves a pre-image from the memory 226. If the POI 102 is being powered-up for the first time, the pre-image is set (seeded) by the manufacturer of the POI 102. If the POI has simply been reset and has previously generated a pre-image, then the previous pre-image is retrieved from the memory 226 (it will be described later that in Step 288, that the updated pre-image is recorded to the memory 226 during the process).

In Step 282, the one way function module 228 obtains a plurality of static data elements that are predetermined, including the acquirer identity number and/or the POI identity number. In Step 284, the one way function module 228 obtains a plurality of variable data elements, including date/time from the clock 220, the random seed 224 and/or a random number from the random number generator 222.

In Step 286, the one way function module performs the first one way function on the retrieved pre-image and the static and variable data elements to update the pre-image. The updated pre-image is then stored to the memory 226 in Step 288. The unpredictable number is generated in Step 290 by performing the second one way function on the updated pre-image. In Step 292, the unpredictable number is sent to the processor 194 of the POI 102.

FIG. 7(*b*) is a flowchart showing an example of the process in FIG. 6 before a ciphertext is generated in payment transactions subsequent to the first payment transaction. In Step 310, the one-way function module 228 retrieves a pre-image from the memory 226. Then, in Step 312, the one-way function module 226 obtains the plurality of variable data elements including date/time from the clock 220, the transaction data and/or the random number from the random number generator 222.

The transaction data is very difficult for an external observer to guess as it depends on many factors such as the exact amount and the payment device chosen by the payment device holder. This increases the unpredictability and hence security of the process.

In Step 314, the one way function module 226 performs the first one way function on the retrieved pre-image and the variable data elements to update the pre-image. The updated pre-image is then stored to the memory in Step 316. The unpredictable number is generated in Step 318 by performing the second one way function on the updated pre-image. In Step 320, the unpredictable number is sent to the processor 194 of the POI 102.

Many modifications may be made to the above examples without departing from the scope of the present invention as defined in the accompanying claims.

The invention claimed is:

1. A method of generating an unpredictable number in a computing device, the method comprising:
   receiving, by a computing device including a processor and a memory, a request to generate an unpredictable number, the request including at least transaction details for a transaction to be completed using the computing device;
   obtaining a plurality of data elements, at least some of the plurality of data elements being variable data obtained from the computing device;
   performing, by the processor of the computing device, a first one way function on an internal pre-image value P and the plurality of data elements including the variable data to update the value P;
   storing the updated value of P in the memory of the computing device;
   performing, by the processor of the computing device, a second one way function on the updated value of P to generate the unpredictable number; and
   transmitting, by the processor of the computing device and in further response to the request, the generated unpredictable number and at least some of the transaction details for the transaction from the computing device to complete the transaction.

2. A method as claimed in claim 1, wherein at least one of the data elements varies with time or with activity of the computing device.

3. A method as claimed in claim 2, wherein at least one of the data elements is at least one of a date and a time from a clock internal to the computing device.

4. A method as claimed in claim 1, wherein at least one of the plurality of data elements is a random number generated internally to the computing device, the method further comprising generating the random number prior to performing the first one way function.

5. A method as claimed in claim 4, wherein generating the random number comprises operating a hardware random number generator internal to the computing device.

6. A method as claimed in claim 1, wherein one or both of the one-way functions are cryptographically secure one-way functions.

7. A method as claimed in claim 6, wherein each cryptographically secure one-way function is a symmetric cipher, an asymmetric cipher, or a hash function.

8. A method as claimed in claim 1, wherein the first one-way function and second one-way function are substantially the same.

9. A method as claimed in claim 1, further comprising:
   obtaining a seeded value of P; and
   obtaining an initial value of the unpredictable number by performing the first one way function on the seeded value of the value P and a plurality of startup data elements to update the value P.

10. A method of authenticating a transaction between computing devices at a first computing device, the method comprising:
    generating an unpredictable number at a first computing device including a processor and a memory based on an application of a first one way function and a second one way function on a plurality of data elements, at least some of the plurality of data elements including variable data, by:
      performing, by the processor of the first computing device, the first one way function on an internal pre-image value P and the plurality of data elements including the variable data to update the value P;
      storing the updated value of P in the memory of the first computing device; and
      performing, by the processor of the first computing device, the second one way function on the updated value of P to generate the unpredictable number;
    transmitting the generated unpredictable number and transaction data to a second computing device;
    receiving, from the second computing device by the first computing device, cryptographically signed data formed from at least some of the transaction data and the unpredictable number;
    determining whether the cryptographically signed data incorporates the unpredictable number; and
    generating an output of the determination of whether the cryptographically signed data incorporates the unpredictable number.

11. A method as claimed in claim 10, wherein at least one of the plurality of data elements is transaction dependent.

12. A method as claimed in claim 11, wherein one or more of the transaction dependent data elements is an identity associated with one of the first and second computing devices.

13. A method as claimed in claim 10, wherein the transaction is a financial transaction, the first computing device is a terminal and the second computing device is at least one of (i) a transaction card and (ii) a proxy for a transaction card.

14. A method as claimed in claim 13, wherein one of the transaction related data elements is a financial value associated with the transaction.

15. A computing device comprising;
    a memory storing processor-executable program code; and
    a processor to execute the processor-executable program code in order to cause the computing device to:
    receive a request to generate an unpredictable number, the request including at least transaction details for a transaction to be completed using the computing device;
    obtain a plurality of data elements, at least some of the plurality of data elements being variable data obtained from the computing device;

perform, by the processor, a first one way function on an internal pre-image value P and the plurality of data elements including the variable data to update the value P;

storing the updated value of P in the memory;

perform, by the processor, a second one way function on the updated value of P to generate the unpredictable number; and transmit, in further response to the request, the generated unpredictable number and at least some of the transaction details for the transaction from the computing device to complete the transaction.

16. A computing device as claimed in claim 15, further comprising a hardware random number generator.

17. A computing device as claimed in claim 15, wherein the processor further executes program code to cause the computing device to authenticate a transaction with a second computing device, where the program code further comprises code to:

transmit the unpredictable number and transaction data to the second computing device;

receive, from the second computing device, cryptographically signed data formed from at least some of the transaction data and the unpredictable number; and review the cryptographically signed data to determine that it incorporates the unpredictable number.

18. A computing device as claimed in claim 17, wherein the computing device is adapted to make a data connection with the second computing device.

19. A computing device as claimed in claim 17, wherein the computing device is a point of interaction or is able to make a data connection with a point of interaction and the second computing device is payment device.

20. A computing device as claimed in claim 17, wherein the point of interaction is a point of sale terminal.

21. A computing device as claimed in claim 17, wherein the point of interaction is an automatic teller machine.

* * * * *